(12) United States Patent
Terzioglu et al.

(10) Patent No.: US 8,699,277 B2
(45) Date of Patent: Apr. 15, 2014

(54) MEMORY CONFIGURED TO PROVIDE SIMULTANEOUS READ/WRITE ACCESS TO MULTIPLE BANKS

(75) Inventors: Esin Terzioglu, San Diego, CA (US); Dongkyu Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/297,771

(22) Filed: Nov. 16, 2011

(65) Prior Publication Data

US 2013/0121086 A1   May 16, 2013

(51) Int. Cl.
*G11C 7/10*   (2006.01)

(52) U.S. Cl.
USPC .......................... 365/189.04; 711/5

(58) Field of Classification Search
USPC .......................... 365/189.04; 711/5
See application file for complete search history.

(56) References Cited

U.S. PATENT DOCUMENTS

| | | | |
|---|---|---|---|
| 5,740,107 A | 4/1998 | Lee | |
| 5,996,051 A | 11/1999 | Mergard | |
| 6,377,492 B1 | 4/2002 | Rong et al. | |
| 6,412,030 B1 | 6/2002 | Adusumilli | |
| 7,533,222 B2 | 5/2009 | Leung | |
| 7,551,512 B2 | 6/2009 | Evans et al. | |
| 7,738,496 B1 | 6/2010 | Raza | |
| 7,739,433 B2 | 6/2010 | Yuenyongsgool et al. | |
| 7,760,562 B2 | 7/2010 | Jung et al. | |
| 8,140,739 B2 * | 3/2012 | Langlois et al. | 711/103 |
| 8,331,123 B2 * | 12/2012 | Schuette | 365/63 |
| 2007/0028027 A1 | 2/2007 | Janzen et al. | |

FOREIGN PATENT DOCUMENTS

CA   2239426 A1   12/1999

OTHER PUBLICATIONS

International Search Report and Written Opinion—PCT/US2012/065658—ISA/EPO—Mar. 11, 2013.

* cited by examiner

*Primary Examiner* — Vanthu Nguyen
(74) *Attorney, Agent, or Firm* — Sam Talpalatsky; Nicholas J. Pauley; Joseph Agusta

(57) ABSTRACT

A memory includes at least first and second banks of single-port memory elements, a first local controller adapted to send read and write instructions to the first memory bank, and a second local controller adapted to send read and write instructions to the second memory bank. A global controller is configured to receive first and second memory addresses and a first indication of an operation to be performed at the first memory addresses and a second indication of an operation to be performed at the second memory address and to instruct the first local controller to perform the first indicated operation at the first memory address and to instruct the second local controller to perform the second indicated operation at the second memory address at the same time.

36 Claims, 4 Drawing Sheets

MEMORY CONFIGURED TO PROVIDE SIMULTANEOUS READ/WRITE ACCESS TO MULTIPLE BANKS

FIELD OF DISCLOSURE

The present application for patent is directed to a computer memory that allows concurrent read and write access to different banks of a multi-bank memory and to a method of providing such access, and, more specifically, to a computer memory that allows concurrent read and write access to different banks of a multi-bank memory by sending an instruction that includes a memory location and an indication of an operation to be performed at the memory location and toward a method of providing such access.

BACKGROUND

Conventional single-port memory generally includes a single set of addresses and a single control. Therefore, it can only be accessed by one device at a time—a single read operation or a single write operation can be performed, but both types of operation cannot be performed at the same time.

When it is desirable provide simultaneous read and write access to a memory, a two-port or multi-port memory may be used. For example, a read access can be made via one port of the memory while a write access is made via the other port. Conventional two-port or multi-port memories, however, generally include more transistors than single-port memories and thus take up more space on a chip than single-port memories. When same-location access is not required (or when it can be prohibited), separate memories can be used; however, there is also an area penalty associated with the use of separate memories since many of the peripheral circuits for one of the memories are duplicated for the other memory. The need for simultaneous read and write access must thus be balanced against the space penalty incurred, and dual- or multi-port memories are generally only selected when the need for simultaneous access outweighs the area and leakage penalties associated therewith. It would therefore be desirable to provide a memory having simultaneous read and write capabilities that improves upon conventional dual- or multi-port memories.

SUMMARY

An exemplary embodiment of the invention comprises a method that includes providing a multi-bank memory having at least first and second memory banks, where each of the first and second memory banks include a plurality of single-port memory elements, and providing first and second local controllers for controlling read and write operations to the first and second memory banks. The method also includes providing a global controller for sending read and write instructions to the first and second local controllers and sending a read instruction to the first local controller and sending a write instruction to the second local controller at the same time.

Another embodiment includes a memory having at least first and second banks of single-port memory elements, a first local controller adapted to send read and write instructions to the first memory bank, a second local controller adapted to send read and write instructions to the second memory bank, and a global controller in communication with the first and second local controllers. The global controller is configured to receive first and second memory addresses and a first indication of an operation to be performed at the first memory addresses and a second indication of an operation to be performed at the second memory address and to instruct the first local controller to perform the first indicated operation at the first memory address and to instruct the second local controller to perform the second indicated operation at the second memory address at the same time.

A further embodiment comprises a method that includes providing a multi-bank memory having at least first and second memory banks, providing at least first and second local controllers adapted to control read and write operations on the at least first and second memory banks, and providing a global controller in communication with the at least first and second local controllers. The method also includes providing the global controller with a first instruction comprising a first memory address and a first operation to be performed at the first memory address and a second instruction comprising a second memory address and a second operation to be performed at the second memory address. The global controller instructs the first local controller to perform the first operation at the first memory address and the second local controller to perform the second operation at the second memory address.

Yet another embodiment comprises a device that includes a multi-bank memory having at least first and second memory banks and at least first and second local controllers adapted to control read and write operations on the at least first and second memory banks. The device also includes a global controller in communication with the at least first and second local controllers, and the global controller is configured to receive a first instruction comprising a first memory address and a first operation to be performed at the first memory address and a second instruction comprising a second memory address and a second operation to be performed at the second memory address. The global controller is also configured to instruct the first local controller to perform the first operation at the first memory address and to instruct the second local controller to perform the second operation at the second memory address.

Another embodiment comprises a memory having a memory element arrangement, a local controller arrangement adapted to send read and write instructions to the memory element arrangement, and a global controller arrangement in communication with the local controller arrangement. The global controller arrangement is configured to receive first and second memory addresses and a first indication of an operation to be performed at a first memory addresses and a second indication of an operation to be performed at a second memory address and to instruct the local controller arrangement to perform the first indicated operation at the first memory address and the second indicated operation at the second memory address at the same time.

A further embodiment comprises a method that includes steps for providing a multi-bank memory having at least first and second memory banks, each of the first and second memory banks comprising a plurality of single-port memory elements, and steps for providing first and second local controllers for controlling read and write operations to the at least first and second memory banks. The method also includes steps for providing a global controller for sending read and write instructions to the first and second local controllers and steps for sending a read instruction to the first local controller and sending a write instruction to the second local controller at the same time.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
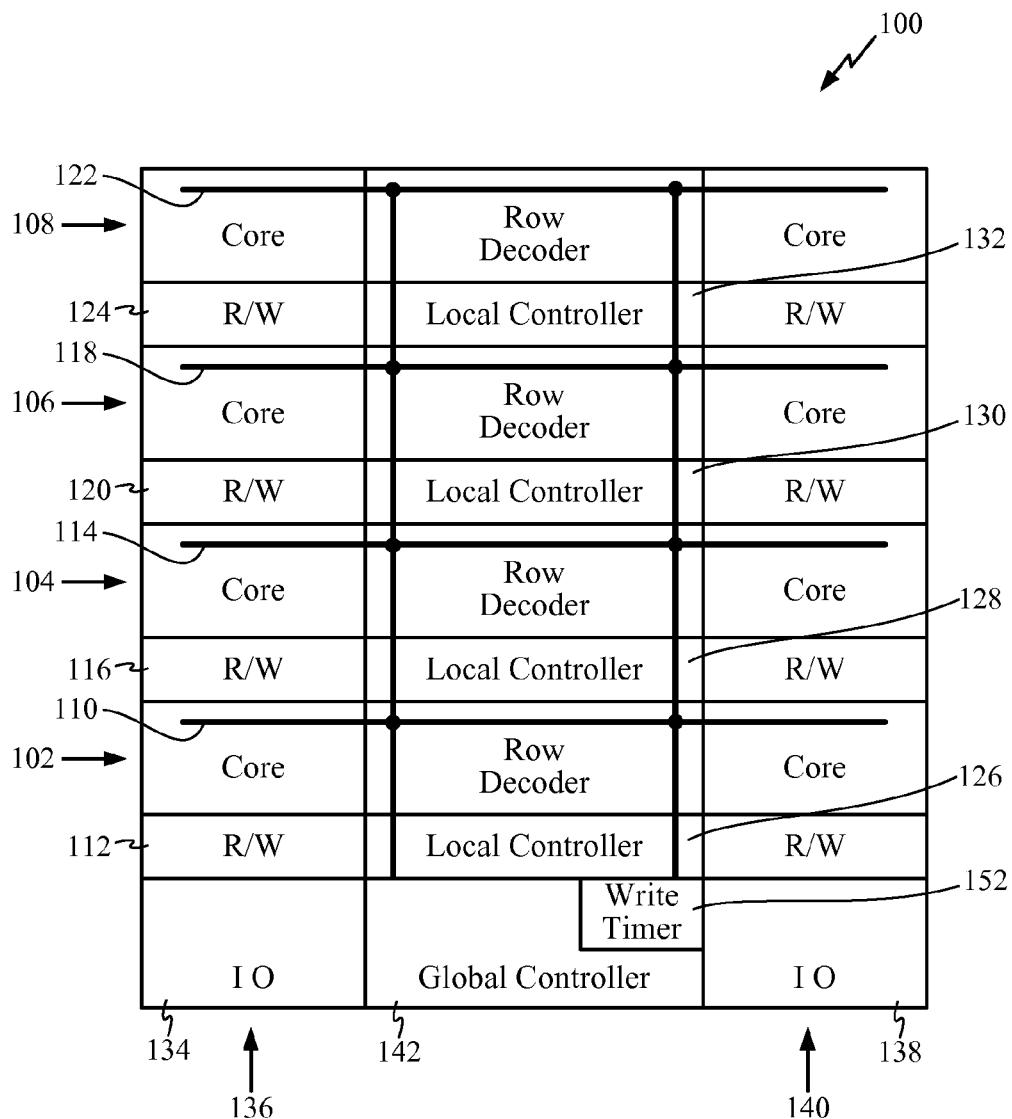
FIG. 1 is a schematic circuit diagram illustrating a memory according to a first embodiment.

FIG. 1 illustrates a multi-bank memory 100 according to a first embodiment that includes a first memory bank 102, a second memory bank 104, a third memory bank 106 and a fourth memory bank 108, it being understood that embodiments with more or fewer memory banks are also within the scope of this disclosure. Each of the first through fourth memory banks 102, 104, 106, 108, includes a word line and associated read/write circuitry that allows read and write operations to be performed on that memory bank. The read/write circuitry includes, for example, a sense amplifier (not illustrated) and a write driver (not illustrated). Specifically, the first memory bank 102 includes a word line 110 and read/write circuitry 112, the second memory bank 104 includes a word line 114 and read/write circuitry 116, the third memory bank 106 includes a word line 118 and read/write circuitry 120, and the fourth memory bank 108 includes a word line 122 and read/write circuitry 124. A local controller is also associated with each of the first through fourth memory banks 102, 104, 106, 108. Specifically, the first memory bank 102 includes a first local controller 126, the second memory bank 104 includes a second local controller 128, the third memory bank 106 includes a third local controller 130 and the fourth memory bank 108 includes a fourth local controller 132. First IO circuitry 134 is associated with the memory elements in a first memory column 136, and second IO circuitry 138 is associated with the memory elements in a second memory column 140, and the first and second IO circuitry 134, 138, allows data to be written to and read from memory elements in the first memory column 136 and second memory column 140 respectively.

Figure 2:
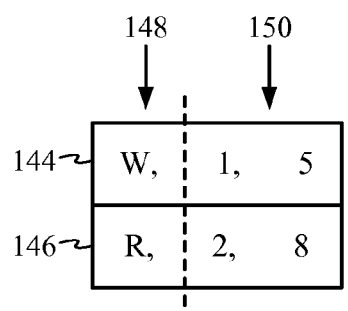
FIG. 2 is a schematic circuit diagram illustrating a memory according to a second embodiment.

A global controller 142 is configured to receive pairs of instructions, each instruction including an indication of an operation to be performed and an identification of a memory addresses at which the instruction is to be performed. The indication, for example, may comprise a part of the received memory address and/or be transmitted concurrently with the memory address. FIG. 2 illustrates first and second representative, instructions 144, 146, each of which includes a first portion 148 identifying an operation to be performed and a second portion 150 identifying a memory address at which the operation is to be performed. The first portion 148 of the first instruction 144 includes a "w" for "write," and the second portion 150 of the first instruction 144 includes a memory address to be written to. In this example, the "1" in the address indicates that the memory element to be accessed is in the first memory bank 102 and the "5" identifies the memory element. The first portion 148 of the second instruction 146 includes an "r" for "read," and the second portion 150 of the second instruction 146 includes a memory address to be read. In this example, the "2" in the address indicates that the memory element to be accessed is in the second memory bank 104 and that a location "8" is to be accessed. While "r" and "w" are used to indicate "read" and "write," respectively, the identifying portion of the instruction will likely be a numerical value that can be interpreted by the global controller 142 as either a read or write instruction. Likewise, the memory addresses in the second portions 150 of the first and second instructions 144, 146 will be provided in a manner that can be readily processed by the global controller.

The multi-bank memory 100 includes separate read and write paths and thus can perform read and write operations at the same time as long as the operations are being performed on different ones of the first through fourth memory banks 102, 104, 106, 108. The global controller 142 is configured to send two instructions to two different ones of the first through fourth local controllers 126, 128, 130, 132 at the same time, and, provided that one operation is a read operation and the other is a write operation, the operations can execute concurrently without any interference in the output data paths. Dual and multi-port memory elements allow for simultaneous access to a given memory element but are more complex and take up more space. In cases where simultaneous access to the same memory element is not required, many of the benefits of dual and multi-port memory can be obtained using single-port memory elements and the present disclosure. As used herein, "simultaneously," "concurrently," and "at the same time" mean that read and write operations are taking place at the same time. These operations, however, may, but do not necessarily have to, start or finish at precisely the same instant. Indeed, depending on the memory, different amounts of time are generally required for read and write operations to occur, and even if started at approximately the same time, one of these operations will generally terminate before the other.

It is desirable that the system accessing the multi-bank memory 100 be configured to avoid sending conflicting memory access requests to the multi-bank memory 100. That is, the system should ensure that the pairs of read and write access requests that are sent to the multi-bank memory 100 are always directed to different ones of the first through fourth memory banks 102, 104, 106, 108. The multi-bank memory 100 may be configured, however, to handle situations where two received instructions are either two read instructions or two write instructions or instructions to read and/or write to the same memory bank. In such case, the global controller 142 may be configured to give priority to one of the instructions over the other or to ignore both instructions and thus avoid conflict.

As previously noted, read and write instructions to a given memory device typically require different amounts of time to execute. For purposes of discussion, it is assumed that performing a write operation on the multi-bank memory 100 requires more time than performing a read operation. However, for other memories, a read access may take a longer time than a write access. To help ensure that the global controller 142 does not begin another read or write operation before a current operation is finished, the global controller 142 includes a write timer 152. The write timer 152 controls the interval at which the global controller 142 sends instructions to the first through fourth local controllers 126, 128, 130, 132 and does not allow read or write instructions to be sent until the write timer 152 has expired indicating that a predetermined time has passed. Because in this embodiment write operations are assumed to require more time than read operations, read operations will necessarily have finished by the time the write timer 152 expires. The multi-bank memory 100 is thus a self-timed memory element that is not dependent on a system clock for determining the timing of memory access.

In operation, the first instruction 144 and the second instruction 146 are received at the global controller 142. The first instruction 144 includes an "r" and an address in the first memory bank 102. The second instruction includes a "w" and an address in the second memory bank 104. The global controller 142 thus sends an instruction to the first local controller 126 in the first memory bank 102 to perform a read operation on the indicated memory location and, substantially simultaneously, sends a write instruction to the second local controller 128 of the second memory bank 104 to perform a write operation at the location indicated. The actual reading and writing of data is performed in a conventional manner, although, unlike conventional memories, it is performed at the same or substantially the same time on the two different memory banks. When the write timer 152 expires, a second pair of memory addresses is received by the global controller 142 and the process continues.

Figure 3:
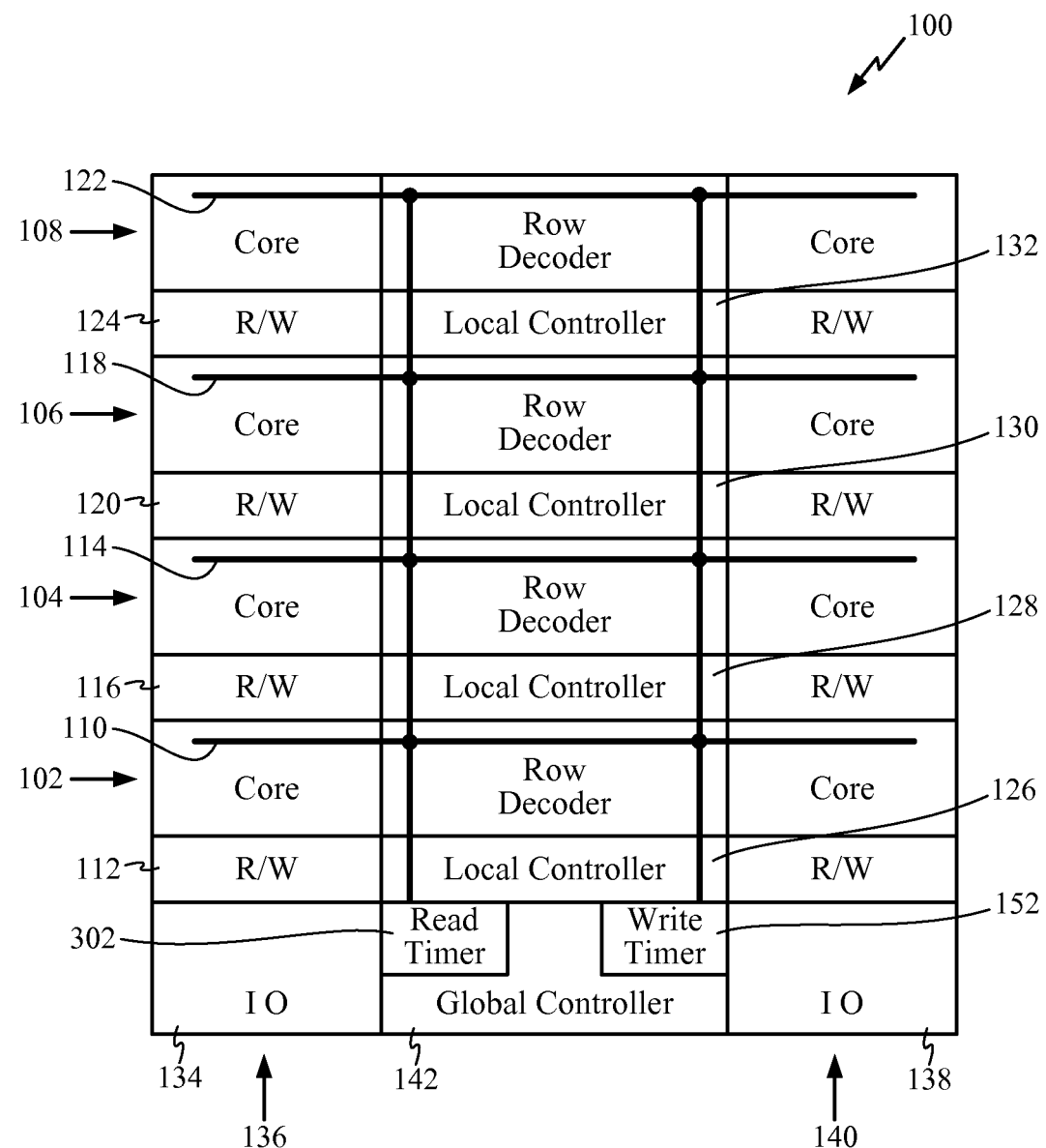
FIG. 3 is a schematic representation of two instructions to be processed by the memory of FIG. 1 or FIG. 2

A second embodiment is illustrated in FIG. 3 in which elements common to the first embodiment are identified with like reference numerals. In FIG. 3, the global controller 142 includes a read timer 302 in addition to the write timer 152 of the first embodiment. The read timer 302 allows the memory 100 to determine independently when read and write operations complete and thus to take appropriate actions based on the actual termination times. For example, if it is determined using the read timer 302 that a read operation has terminated, it may be possible to begin appropriate pre-charging of a read bit line without waiting for the writing operation to complete.

The memory 100 thus provides the benefit of allowing simultaneous read and write operations to different memory banks of a multi-bank memory which is formed of single-port memory elements. This provides many of the benefits of dual- or multi-port memory and allows for simultaneous read and write operations as long as simultaneous operations on the same memory bank are prevented.

Memories according to disclosed embodiments may be formed or integrated into one or more semiconductor dies and/or into various devices, including, without limitation, a set top box, a music player, a video player, an entertainment unit, a navigation device, a communications device, a personal digital assistant (PDA), a fixed location data unit, and a computer.

Figure 4:
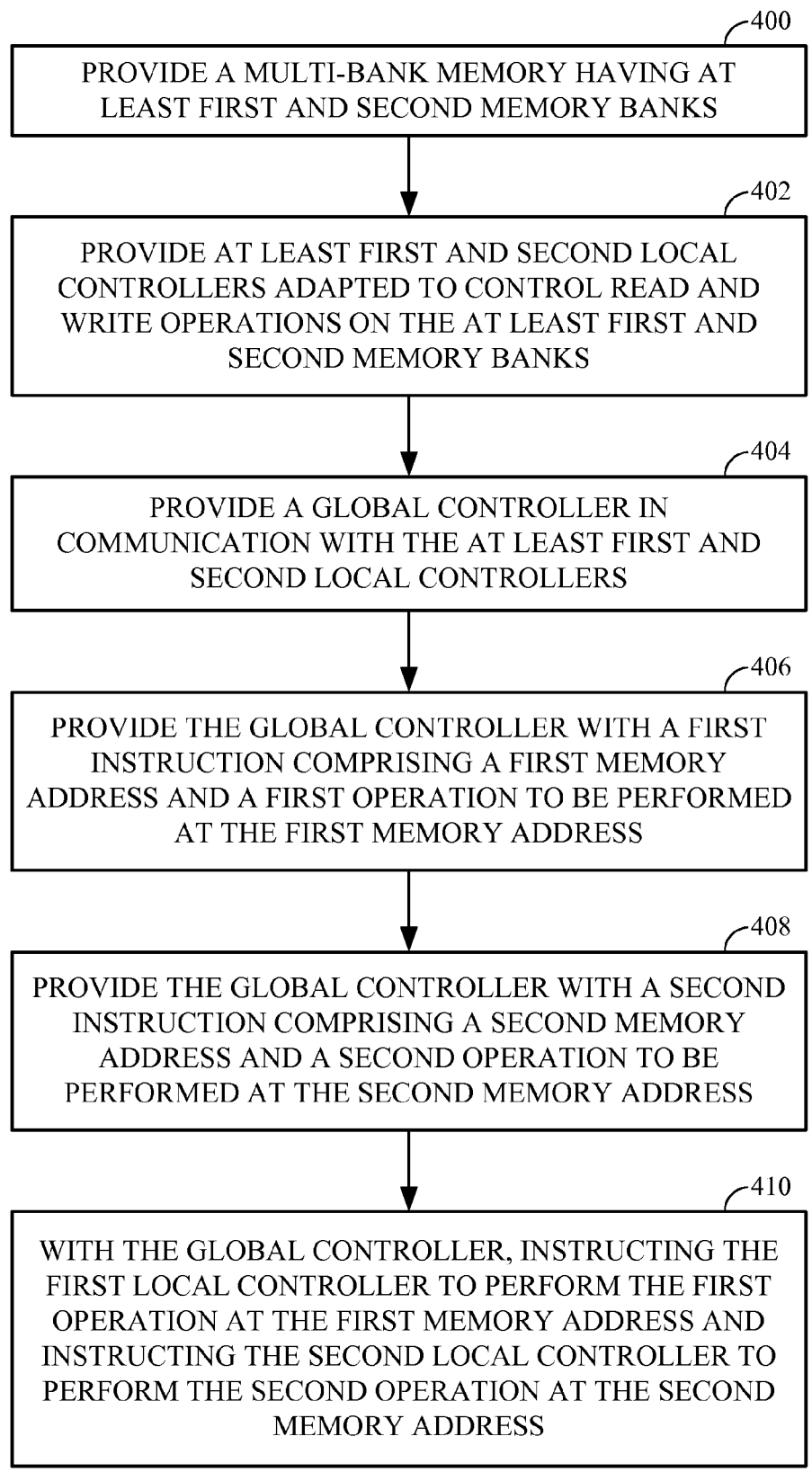
FIG. 4 is a flow chart illustrating a method according to an embodiment.
Figure 5:
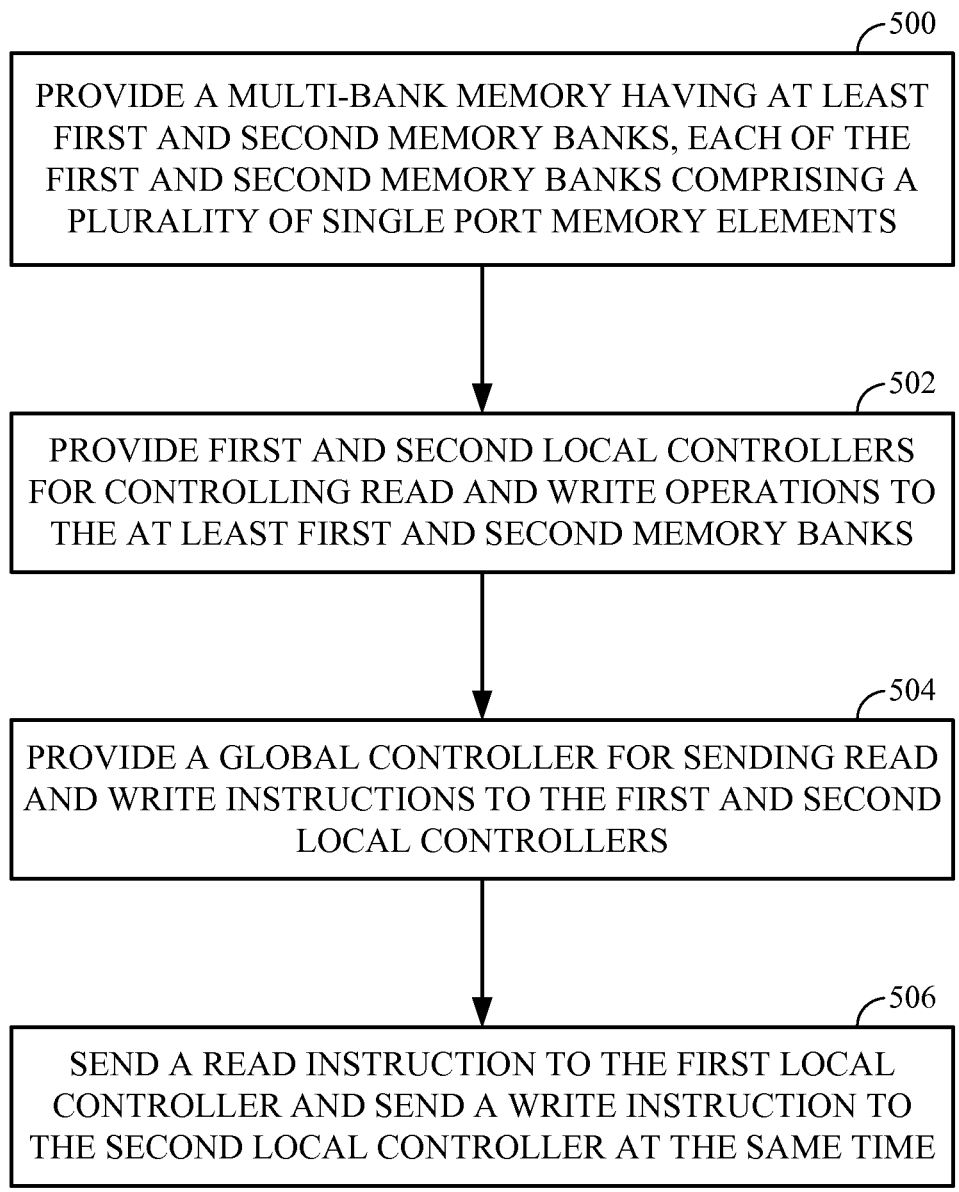
FIG. 5 is a flow chart illustrating a method according to another embodiment.

A method according to an embodiment is illustrated in FIG. 4 and includes a block 400 of providing a multi-bank memory having at least first and second memory banks, a block 402 of providing at least first and second local controllers adapted to control read and write operations on the at least first and second memory banks, a block 404 of providing a global controller in communication with the at least first and second local controllers, a block 406 of providing the global controller with a first instruction comprising a first memory address and a first operation to be performed at the first memory address, a block 408 of providing the global controller with a second instruction comprising a second memory address and a second operation to be performed at the second memory address, and a block 410 of the global controller instructing the first local controller to perform the first operation at the first memory address and instructing the second local controller to perform the second operation at the second memory address.

Another method according to an additional embodiment is illustrated in FIG. 6 and includes a block 500 of providing a multi-bank memory having at least first and second memory banks, each of the first and second memory banks comprising a plurality of single-port memory elements, a block 502 of providing first and second local controllers for controlling read and write operations to the at least first and second memory banks, a block 504 of providing a global controller for sending read and write instructions to the first and second local controllers, and a block 506 of sending a read instruction to the first local controller and sending a write instruction to the second local controller at the same time.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
    providing a multi-bank memory having at least first and second memory banks, each of the at least first and second memory banks comprising a plurality of single-port memory elements;
    providing first and second local controllers for controlling read and write operations to the at least first and second memory banks;
    providing a global controller for sending read and write instructions to the first and second local controllers;
    receiving, at the global controller, a first instruction comprising a first memory address and a first operation to be performed at the first memory address and a second instruction comprising a second memory address and a second operation to be performed at the second memory address; and
    sending, by the global controller, a read instruction to the first local controller and sending a write instruction to the second local controller at substantially the same time.

2. The method of claim 1, further comprising executing the read instruction by the first local controller while the second local controller executes the write instruction.

3. A memory comprising:
    at least first and second memory banks that each comprise a plurality of single-port memory elements;
    a first local controller adapted to send read and write instructions to the first memory bank;
    a second local controller adapted to send read and write instructions to the second memory bank; and
    a global controller in communication with the first and second local controllers;
    wherein the global controller is configured to receive first and second memory addresses and a first indication of an operation to be performed at the first memory address and a second indication of an operation to be performed at the second memory address and to instruct the first local controller to perform the first indicated operation at the first memory address and to instruct the second local controller to perform the second indicated operation at the second memory address at substantially the same time.

4. The memory of claim 3, wherein the first indication of an operation to be performed at the first memory address comprises a part of the first memory address.

5. The memory of claim 4, wherein the first indicated operation is a read operation and the second indicated operation is a write operation.

6. The memory of claim 5, wherein the first local controller executes the read operation while the second local controller executes the write operation.

7. A method comprising:
    providing a multi-bank memory having at least first and second memory banks that each comprise a plurality of single-port memory elements;
    providing at least first and second local controllers adapted to control read and write operations on the at least first and second memory banks;
    providing a global controller in communication with the at least first and second local controllers;
    receiving, at the global controller, a first instruction comprising a first memory address and a first operation to be performed at the first memory address;
    receiving, at the global controller, a second instruction comprising a second memory address and a second operation to be performed at the second memory address; and
    instructing, by the global controller, the first local controller to perform the first operation at the first memory address and the second local controller to perform the second operation at the second memory address.

8. The method of claim 7, wherein the global controller instructs the second local controller to perform the second operation at the second memory address before the first operation has finished.

9. The method of claim 7, wherein the global controller instructs the first local controller to perform the first operation at the first memory address and the second local controller to perform the second operation at the second memory address at substantially the same time.

10. The method of claim 9, including providing separate read and write paths for each of the at least first and second memory banks.

11. The method of claim 9, wherein the second operation is different than the first operation.

12. The method of claim 11, wherein the first operation comprises one of a read operation and a write operation and wherein the second operation comprises the other one of the read operation and the write operation.

13. The method of claim 12, including preventing the global controller from instructing the first local controller to perform the first operation if a previous read operation or a previous write operation is still in progress.

14. The method of claim 12, including determining whether a predetermined time has passed since sending the first instruction to the first local controller before sending a subsequent instruction to the first local controller.

15. The method of claim 7, including integrating the multi-bank memory into at least one semiconductor die.

16. The method of claim 7, including integrating the multi-bank memory into a device selected from the group consisting of a set top box, a music player, a video player, an entertainment unit, a navigation device, a communications device, a personal digital assistant (PDA), a fixed location data unit, and a computer.

17. A device comprising:
    a multi-bank memory having at least first and second memory banks that each comprise a plurality of single-port memory elements;

at least first and second local controllers adapted to control read and write operations on the at least first and second memory banks; and a global controller in communication with the at least first and second local controllers, wherein the global controller is configured to receive a first instruction comprising a first memory address and a first operation to be performed at the first memory address and a second instruction comprising a second memory address and a second operation to be performed at the second memory address, and wherein the global controller is configured to instruct the first local controller to perform the first operation at the first memory address and to instruct the second local controller to perform the second operation at the second memory address.

18. The device of claim 17, wherein the global controller is configured to instruct the second local controller to perform the second operation at the second memory address before the first operation has finished.

19. The device of claim 17, wherein the global controller is configured to instruct the first local controller to perform the first operation at the first memory address and to instruct the second local controller to perform the second operation at the second memory address at substantially the same time.

20. The device of claim 19, wherein the second operation is different than the first operation.

21. The device of claim 20, wherein the first operation comprises one of a read operation and a write operation and wherein the second operation comprises the other one of the read operation and the write operation.

22. The device of claim 21, wherein the global controller is configured to refrain from instructing the first local controller to perform the first operation if a previous read operation or a previous write operation is being performed on the first memory bank.

23. The device of claim 21, wherein the global controller is configured to determine whether a predetermined time has passed since instructing the first local controller to perform the first operation before instructing the first local controller to perform a subsequent operation.

24. The device of claim 17, including separate read and write paths for each of the at least first and second memory banks.

25. The device of claim 17, including a first self-timed memory control for determining an end of a write operation.

26. The device of claim 25, including a second self-timed memory control for determining an end of a read operation.

27. The device of claim 17 integrated into at least one semiconductor die.

28. The device of claim 17 integrated into a device selected from the group consisting of a set top box, a music player, a video player, an entertainment unit, a navigation device, a communications device, a personal digital assistant (PDA), a fixed location data unit, and a computer.

29. A memory comprising:
a plurality of memory bank means that each comprise a plurality of single-port memory element means;
a plurality of local controller means respectively adapted to send read and write instructions to the plurality of memory bank means; and
global controller means in communication with the plurality of local controller means;
wherein the global controller means is configured to receive first and second memory addresses and a first indication of an operation to be performed at the first memory addresses and a second indication of an operation to be performed at the second memory address and to instruct a first one of the plurality of local controller means to perform the first indicated operation at the first memory address and to instruct a second one of the plurality of local controller means to perform the second indicated operation at the second memory address at substantially the same time.

30. The memory of claim 29, wherein the first memory address is located in a first one of the plurality of memory bank means and the second memory address is located in a second one of the plurality of memory bank means and wherein the first indicated operation is different than the second indicated operation.

31. The memory of claim 30 wherein the first indicated operation comprises a read operation and the second indicated operation comprises a write operation and wherein the first one of the plurality of local controller means executes the read operation while the second one of the plurality of local controller means executes the write operation.

32. A method comprising:
one or more steps for providing a multi-bank memory having at least first and second memory banks, each of the first and second memory banks comprising a plurality of single-port memory elements;
one or more steps for providing first and second local controllers for controlling read and write operations to the at least first and second memory banks;
one or more steps for providing a global controller for sending read and write instructions to the first and second local controllers;
one or more steps for receiving, at the global controller, a first instruction comprising a first memory address and a first operation to be performed at the first memory address and a second instruction comprising a second memory address and a second operation to be performed at the second memory address; and
one or more steps for sending, by the global controller, a read instruction to the first local controller and sending a write instruction to the second local controller at substantially the same time.

33. A method, comprising:
receiving a read instruction at a multi-bank memory having at least a first memory bank and a second memory bank that each comprise a plurality of single-port memory elements, wherein the read instruction comprises a read operation to be performed at a first memory address in the first memory bank;
receiving, at the multi-bank memory, a write instruction that comprises a write operation to be performed at a second memory address in the second memory bank, wherein the multi-bank memory further comprises a global controller adapted to receive the read instruction and the write instruction; and
instructing, by the global controller, a first local controller to perform the read operation at the first memory address and a second local controller to perform the write operation at the second memory address at substantially the same time, wherein the first local controller and the second local controller are located in the multi-bank memory and respectively adapted to control read and write access to the first memory bank and the second memory bank.

34. The method of claim 33, further comprising:
executing the read operation at the first memory address and the write operation at the second memory address at substantially the same time.

35. A multi-bank memory, comprising:
a first memory bank having a first plurality of single-port memory elements and a first local controller adapted to control read and write access to the first memory bank;
a second memory bank having a second plurality of single-port memory elements and a second local controller adapted to control read and write access to the second memory bank; and
a global controller adapted to:
- receive a read instruction that comprises a read operation to be performed at a first memory address in the first memory bank;
- receive a write instruction that comprises a write operation to be performed at a second memory address in the second memory bank; and
- instruct the first local controller to perform the read operation at the first memory address and instruct the second local controller to perform the write operation at the second memory address at substantially the same time.

36. A memory device, comprising:
a first memory bank having a first plurality of single-port memory elements;
a second memory bank having a second plurality of single-port memory elements; and
a machine-readable storage medium having machine-readable instructions stored thereon, wherein the machine-readable instructions, when executed, cause the memory device to:
- receive an instruction pair at a global controller coupled to the first memory bank and the second memory bank, wherein the instruction pair received at the global controller indicates a read operation to be performed at a first memory address in the first memory bank and a write operation to be performed at a second memory address in the second memory bank; and
- execute the read operation indicated in the received instruction pair at the first memory address and the write operation indicated in the received instruction pair at the second memory address at substantially the same time.

* * * * *